United States Patent [19]

Bergero

[11] 4,311,435
[45] Jan. 19, 1982

[54] BALANCED POWER TRANSMISSION DEVICE

[76] Inventor: Ramon Bergero, 3925 W. 148th St., Hawthorne, Calif. 90250

[21] Appl. No.: 81,033

[22] Filed: Oct. 1, 1979

[51] Int. Cl.³ .................. F03D 11/02; F16H 35/00
[52] U.S. Cl. ........................... 416/170 R; 74/381; 74/417; 192/48.92
[58] Field of Search ............. 416/11, 170 R, 170 A, 416/170 B; 74/381, 417; 192/48.92; 290/44, 55

[56] References Cited

U.S. PATENT DOCUMENTS

| | | | |
|---|---|---|---|
| 283,079 | 8/1883 | Conradson | 74/381 |
| 381,313 | 4/1888 | Winchell | 416/170 A |
| 389,342 | 9/1888 | Tuckwood | 416/170 A |
| 429,931 | 6/1890 | Martin | 74/381 |
| 508,009 | 11/1893 | George | 416/170 A |
| 1,925,662 | 9/1933 | Hume | 192/48.92 |
| 2,494,217 | 1/1950 | Watson | 74/381 X |

FOREIGN PATENT DOCUMENTS

964995  8/1950  France .................. 416/170 A

*Primary Examiner*—Leonard E. Smith

*Attorney, Agent, or Firm*—Singer & Singer

[57] ABSTRACT

A balanced power transmission device having specific utility for windmill applications utilizing conventional propellers on a horizontal shaft. The horizontal propeller shaft is located on a tower and drives a pair of freely rotating gears in opposite directions mounted on vertical coaxial shafts. The opposite rotating gears are each variably connected to counter-rotating coaxial shafts through individual ratchets that cause the shafts to rotate in opposite directions and thereby balance out any residual torque. The counter rotating shafts extend to the base of the supporting tower and are connected in a driving relationship through a pair of gears each directly connected to the coaxial shafts. The pair of gears drive a single bevel gear which in turn is connected to a suitable generator located on the ground for generating electric energy. The counter rotating coaxial shafts prevent any tendency of the propeller shaft to rotate about the drive shafts due to torque caused by propeller rotation. A change in wind direction allows the propeller shaft to rotate and align itself with the wind without any tendency for uncontrolled rotation. The balanced output eliminates the need for yaw control.

4 Claims, 11 Drawing Figures

BALANCED POWER TRANSMISSION DEVICE

This invention is concerned with a balanced power transfer device that reduces torque of the power transfer shaft by converting the power shaft into a pair of counter rotating shafts coaxial one with the other and more particularly to a novel power transfer device having specific utility in a wind driven machine by eliminating the necessity for a yaw control to turn the machine into the wind as the wind direction changes.

Science has always attempted to harnass the natural elements in an effort to generate energy for human consumption. These efforts have resulted in solar devices for converting heat energy to electricity and windmills also called wind machines for converting wind energy into electricity.

The natural depletion of fossil energy and the reluctance by some portions of the public to utilize nuclear energy has caused a reevaluation of techniques for harnassing heat from the sun, energy from the tides, and power from the wind.

This invention is concerned primarily with the problem of efficiently harnassing wind energy and converting this energy to electrical energy for consumption by the general public.

The harnassing of wind energy requires the use of a substantial tower having a large propeller or array at the uppermost portion capable of being rotated by the wind. The rotational force captured by the propeller or array must then be communicated to a drive shaft which in turn is connected to an electric generator or other suitable energy conversion device for transmission to the ultimate consumer.

The conventional wind foil is in the form of a propeller that is adapted to face into the wind and to be rotated by the wind energy. The technique of utilizing a horizontal axis connected to a propeller which faces the wind has the unique disadvantage of requiring a yaw control to keep the propeller facing into the wind.

For example, utilizing a horizontal shaft connected to a propeller located at the top of a tall tower and driving a horizontal gear by means of a beveled pinion gear with the generator at the base of the shaft has the unique disadvantage in the absence of a yaw control of resulting in a rotation of the horizontal propeller shaft around the vertical shaft due to the propeller rotation. This rotation or yaw of the horizontal propeller shaft must be compensated for to prevent rotation about the vertical shaft. In the conventional system a large vane acting as a tail is acted upon by the wind to cause the propeller to weather vane back into the wind direction.

The simple weather vane is a yaw correction device that is useful for small windmills but is certainly not useful or practical for the large size propellers needed to develop appreciable power from the wind.

The industry has recognized the yaw control problem of conventional horizontal shaft propellers and as a result has directed its attention to certain novel arrangements known as vertical access windmills. These vertical access types have a variety of different names that are known as the Darrius, the Giromill and the Cyclogyro, just to name a few. These new and novel vertical access windmills do not require a yaw control and allow the generating equipment to be located on the ground.

The vertical access windmills do not have a propeller as such and appear to be completely symmetrical about a vertical access thereby eliminating the yawing problem. This of course should be compared to conventional propellers that are mounted on a horizontal access. Unfortunately the so-called vertical arrays are not self-starting and must be brought to speed which of necessity creates additional problems not associated with horizontal access propeller driven windmills.

In an effort to capitalize on the advanced art of horizontal access devices with conventional propellers, there have been proposed systems in which the electrical generators are mounted directly behind the horizontal shafts and on top of the large towers supporting the propeller shafts. These systems are extremely successful since the torque problem and yaw control is eliminated by having the generator on top of the shaft directly connected to the horizontal shaft driven by the propeller. Unfortunately the size of the electrical generator is severely limited and such systems are thereby incapable of developing useful amounts of power to make them economically viable.

In the present invention there is disclosed a system utilizing a horizontal propeller shaft with a conventional propeller having a balanced power transfer system from the propeller shaft to the electrical generators located at the base of the tower. In this fashion all tendency of the propeller shaft to yaw is eliminated since the power output is balanced and substantial amounts of electrical power can be generated by utilizing electrical generators on the ground where the size is determined solely by the size of the propeller and the height of the shaft and the amount of kinetic energy being harnassed.

The driving propeller is of substantial size and is connected at one end of a horizontal shaft. The other end is connected to a single bevel gear.

The beveled gear is engaged in a driving relationship with a double gear arrangement, each rotating in an opposite direction and mounted respectively to a pair of coaxial shafts adapted to rotate in opposite directions.

The double gears are free to rotate on the coaxial shafts respectively and are engagable by means of a ratchet device so as to drive the coaxial shafts in counter rotating directions when the propeller shaft turns in a given direction. Rotation about the vertical shaft caused by a change in wind direction will simply cause one or the other of the pawls or ratchets to slip depending on the direction of rotation.

Located at the base of the tower are a second double gear arrangement maintained in a driving relationship with the beveled gear attached to a shaft for driving an electrical generator located on the ground. Each gear of the second double gear arrangement are fixedly attached to the coaxial shafts respectively whereby each gear rotates in the opposite direction and thereby drives and generator shaft in a given direction and in a balanced manner.

The coaxial transmission shaft from the horizontal propeller shaft to the horizontal generator driving shaft are driven in an equal and opposite direction thereby eliminating any preferred torque and eliminating the requirement for a yaw control to maintain the horizontal propeller shaft in the direction of the wind.

A change in wind direction will allow the horizontal propeller shaft to rotate and align itself with the wind and in either direction as a result of the ratchets on the first double gear arrangement that drive the counter rotating coaxial shafts.

A shift of the wind in one direction will cause one ratchet to slip whereas a shift in the opposite direction will cause the other ratchet to slip and without loading down the transmission shaft or causing a change in the direction of the coaxial shafts.

Further objects and advantages will be made more apparent by referring now to the accompanying drawings wherein.

Figure 7:
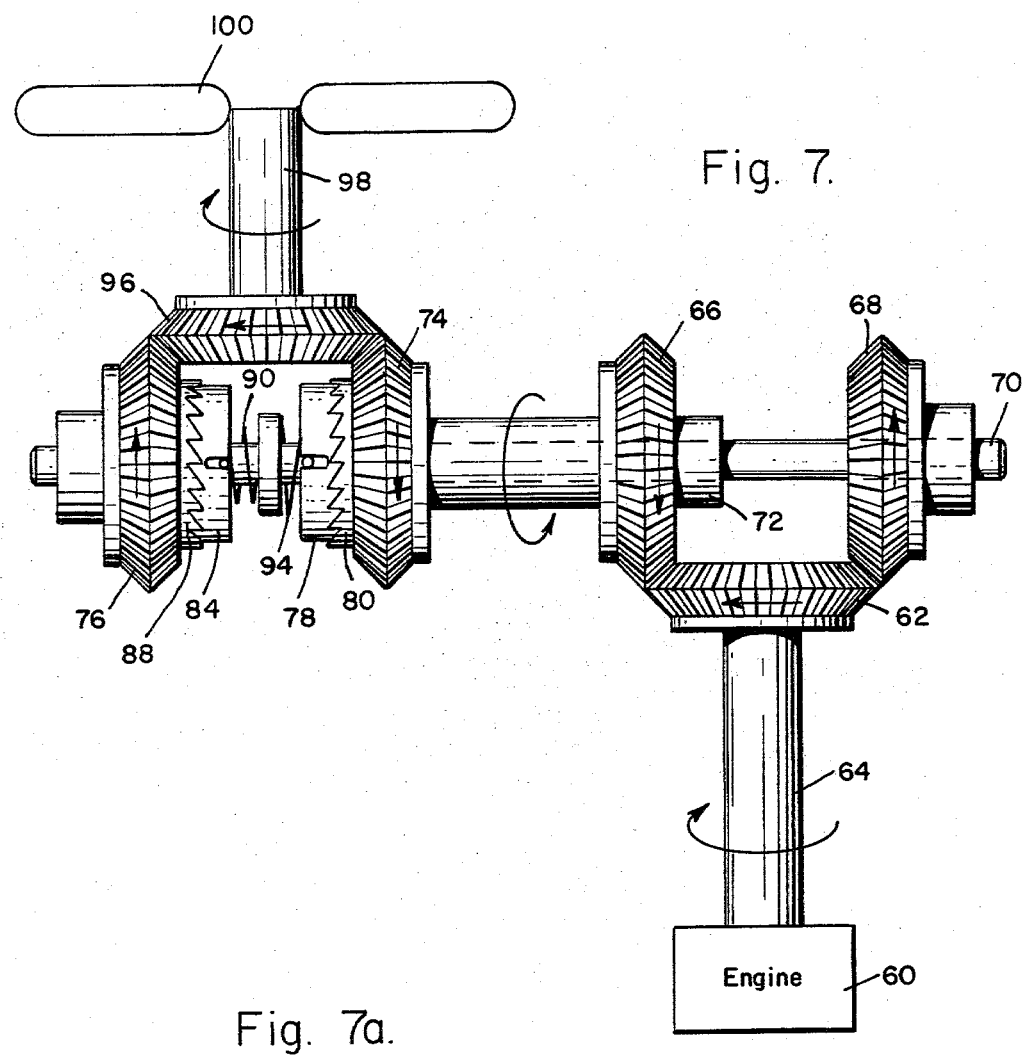
Figure 7A:
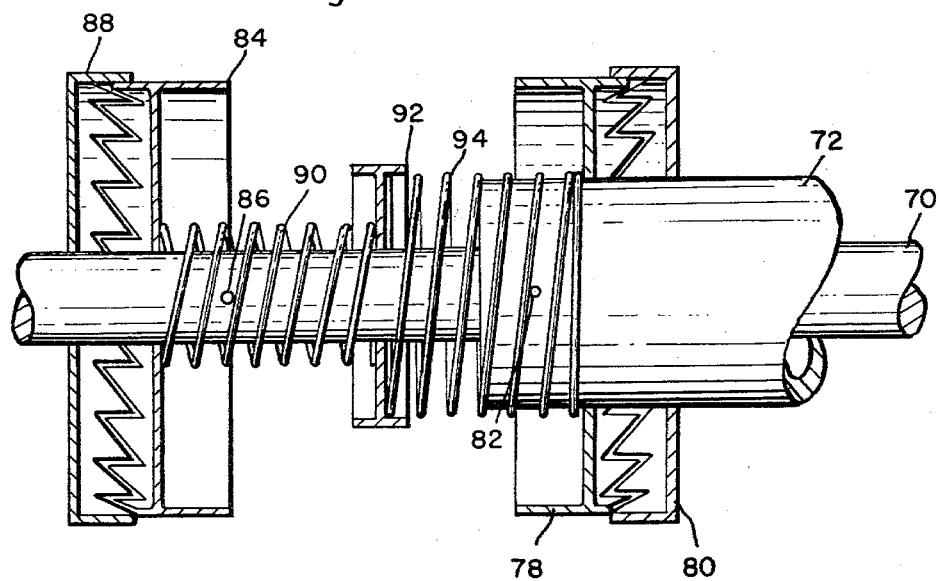

FIGS. 4a, 4b, 5a, 5b, 6a, and 6b illustrate the action of the pawls as the horizontal gear rotates in accordance with wind changes;

FIG. 7 illustrates a plan view of a second embodiment of the invention; and

FIG. 8 is an exploded view of the ratchet assembly of FIG. 7.

Figure 1:
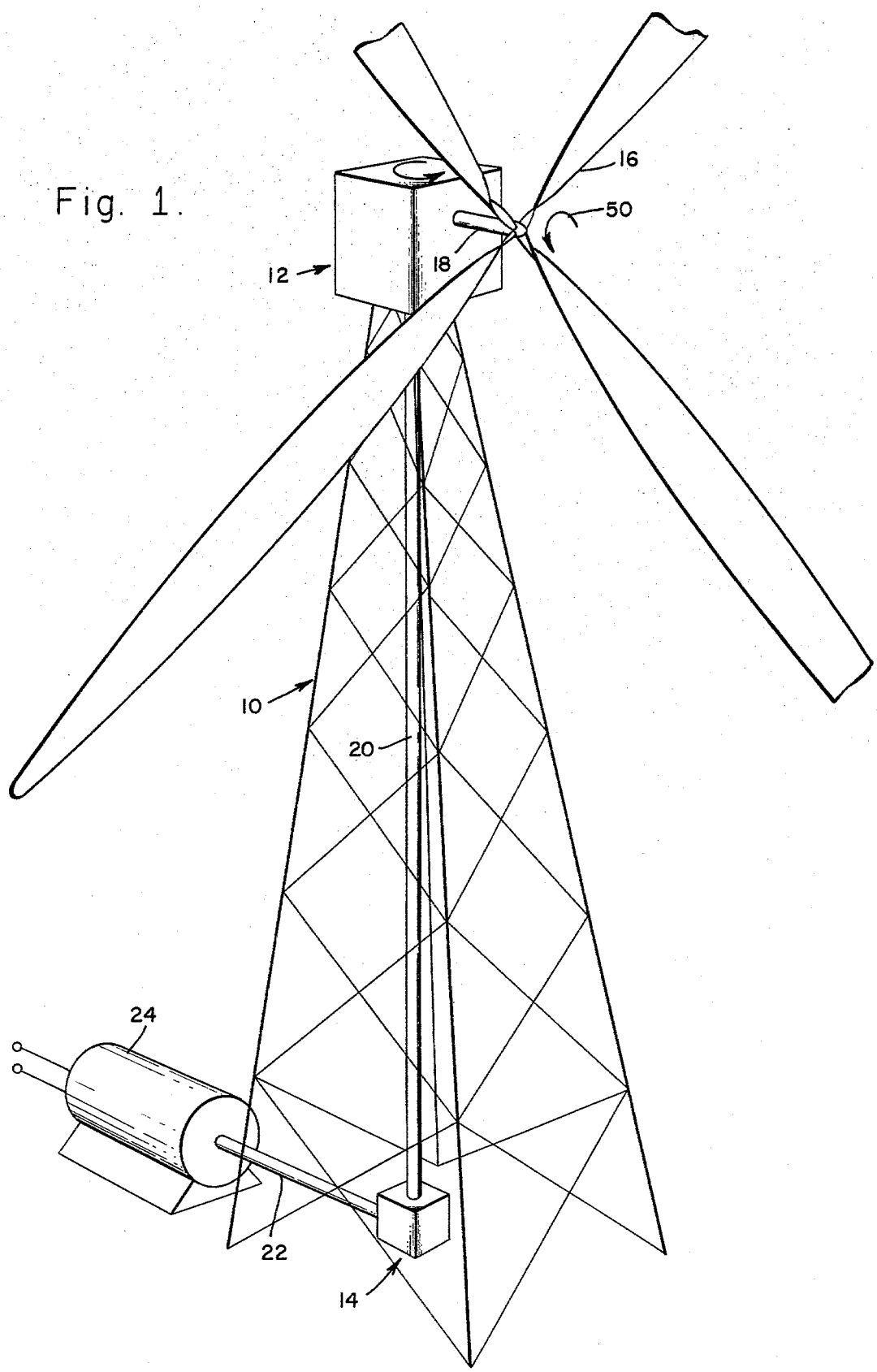
FIG. 1 illustrates the basic concept of the present invention for generating electric power from wind energy.

Referring now to FIG. 1, there is shown a conventional tower 10 supporting a first rotatable transmission box 12 on the uppermost portion of the tower and a lower transmission box 14 at the base of the tower.

A propeller 16 having an air foil and diameter and adapted to harness wind energy for the generation of power is attached to a horizontal shaft 18 attached to transmission box 12. A vertical coaxial shaft 20 from transmission box 12 communicates with transmission box 14 located on the ground for generating power in the form of rotation of a horizontal shaft 22 connected to an electrical generator 24.

In operation wind energy causes blades 16 to rotate horizontal shaft 18. Transmission box 12 converts the rotational energy of shaft 18 to rotational energy of coaxial shaft 20 which feeds transmission box 14. The output of transmission box 14 causes rotation of shaft 22 which drives the electrical generator 24.

In conventional systems utilizing a horizontal shaft 18 with conventional propeller 16, rotation of the shaft 18 generates a torque about vertical shaft 20 so as to cause a rotation of transmission box 12 about the vertical shaft 20. In conventional systems a restraining device sometimes called a yaw control is used to prevent rotation and to keep the propeller 16 in the face of the wind.

The torque energy is particularly sensitive on a windmill structure because the transmission box 12 is loosely mounted on top of the tower 10 to thereby allow the transmission box to rotate in accordance with changes in direction of the wind energy.

In the present invention the vertical output coaxial shaft 20 is actually a pair of shafts coaxial with each other and rotating in opposite directions thereby cancelling out any residual torque caused by the rotation of the propeller 16 and the shaft 18.

The elimination of the torque energy about the shaft 20 eliminates the need for a yaw device and hence allows the blade 16 to respond immediately to changes in direction of the wind and without any tendency of the transmission box 12 to rotate about the vertical shaft 20. In the preferred embodiment the propeller 16 is designed as a pusher propeller with the wind coming from the reverse side as indicated thereby enhancing the tendency of the transmission box to rotate and align the blade 16 in a direction normal to the direction of the wind.

Figure 2:
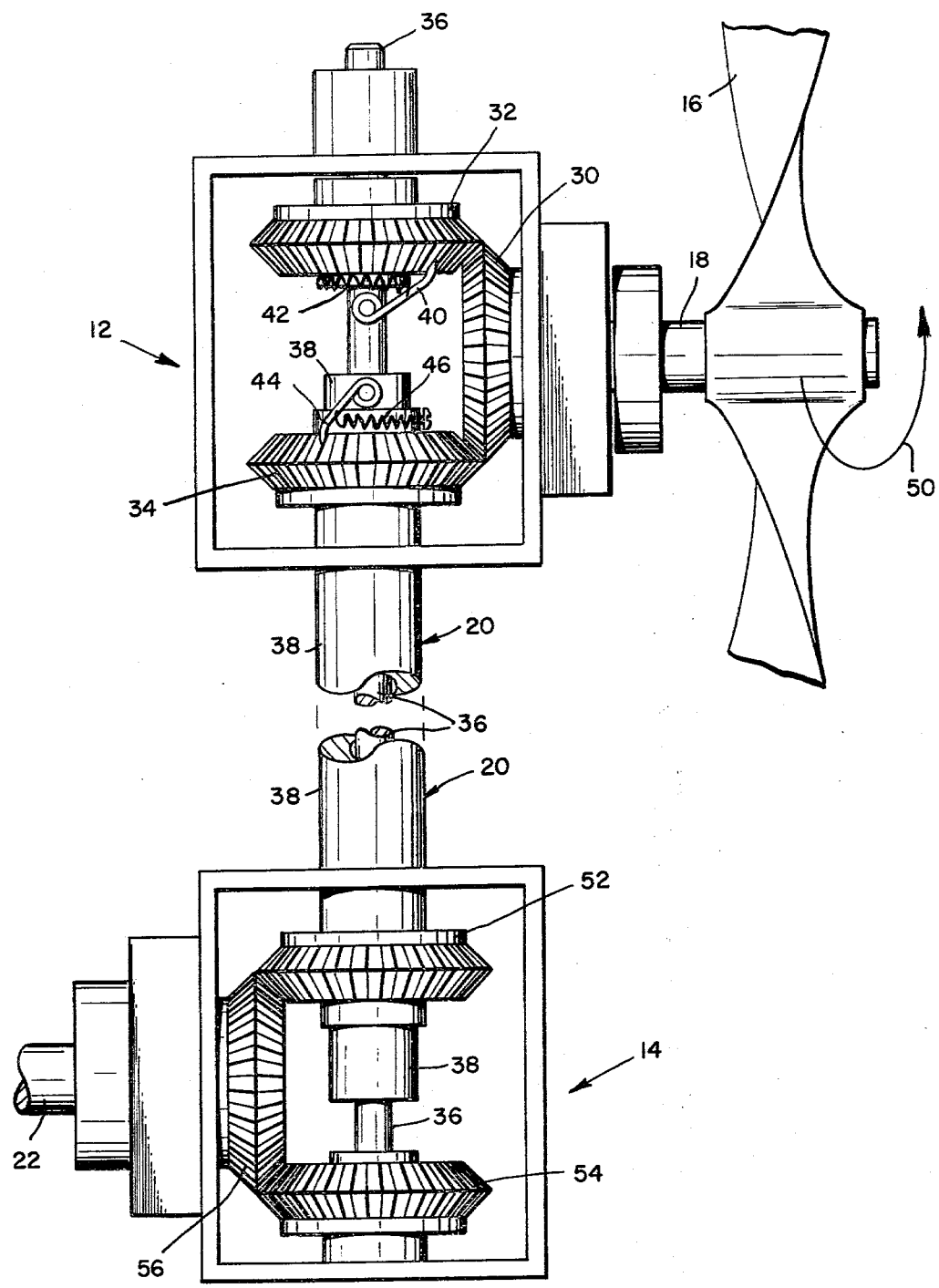
FIG. 2 illustrates a plan view of the transmission boxes located at the top of the tower and at the base of the tower.
Figure 3:
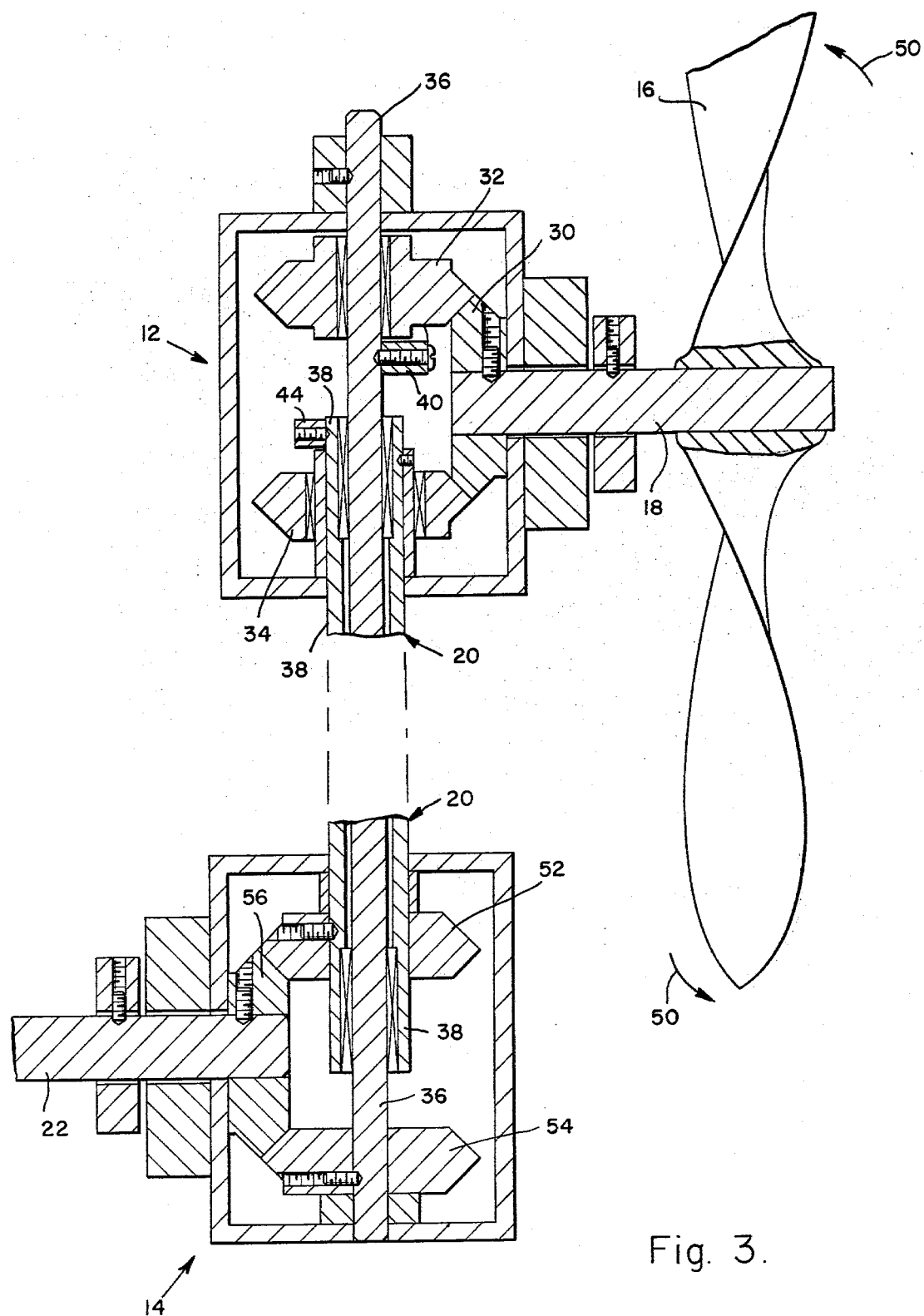
FIG. 3 is a cross-sectional view of FIG. 2.

Referring now to FIGS. 2 and 3, there is shown a plan view of transmission box 12 located at the top of the tower and transmission box 14 located at the base of the tower and with the covers removed to more fully illustrate the double gear arrangement each rotating in an opposite direction so as to counteract and balance out the torque which tends to rotate the horizontal shaft 18 about the vertical shaft 20.

The horizontal shaft 18 driven by propeller 16 is connected to a bevel gear 30 which is fixedly attached at one end of shaft 18. Gear 30 is meshed in a driving relationship with bevel gears 32 and 34 which are each adapted to freely rotate about coaxial shaft 20. In other words gears 32 and 34 are free to rotate and are not attached to any portion of the coaxial vertical shaft 20.

Vertical coaxial shaft 20 is actually constructed of an inner shaft 36 extending through the upper transmission box 12 and into the lower transmission box 14 and which is partially enclosed by a coaxial sleeve or shaft 38.

Gear 32 is free to rotate about shaft 36. Gear 34 is free to rotate about sleeve 38. On the other hand, sleeve 38 is also free to rotate about shaft 36. Shaft 36 extends from the uppermost transmission box 12 to the bottom transmission box 14 whereas sleeve 38 extends only from a point just above gear 34 to a point located substantially midway within the lower transmission box 14.

Located within the upper transmission box 12 is a pawl 40 that is fixedly attached to shaft 36 and urged by means of the spring 42 to engage with the teeth of gear 32. In a similar fashion pawl 44 is fixedly attached to sleeve 38 and urged against gear 34 by means of spring 46.

With the blades 16 caused to rotate in a given direction as indicated by arrows 50, shaft 18 will rotate causing gear 30 to rotate which in turn rotates gears 32 and 34 in opposite directions. Pawls 40 and 44 are located so as to engage gears 32 and 34, respectively, so as to drive shaft 36 and sleeve 38 when blades 16 are rotated in the direction indicated by arrows 50.

Referring now to the lower transmission box 14, there is illustrated gear 52 fixedly attached to sleeve 38 so that gear 52 rotates as sleeve 38 rotates. In a similar fashion gear 54 is fixedly attached to shaft 36 so that gear 54 rotates as shaft 36 rotates. Gears 52 and 54 will therefore rotate in opposite directions and are mounted so as to mesh with bevel gear 56 which is fixedly attached to one end of shaft 22, the other end of which is attached and drives the electric generator 24 illustrated in FIG. 1.

A review of the operation of the device will show that as blades 16 are rotated in the direction indicated by arrow 50 that shaft 18 is rotated thereby causing gear 30 to rotate in the same direction which causes rotation of gears 32 and 34 to rotate and in opposite directions. Pawl 40 and pawl 44 are individually urged against gears 32 and 34, respectively, thereby driving shaft 36 and sleeve 38 and in opposite directions. Since gears 52 and 54 located in the lower transmission box 14 are fixedly attached to sleeve 38 and shaft 36 respectively, gears 52 and 54 will be rotated in opposite directions to drive gear 56 and ultimately rotate shaft 22 which drives the electric generator. The rotation of blades 16 rotates the double gears 32 and 34 which causes the counter rotation of coaxial shaft 36 and sleeve 38 thereby removing all torque in the vertical drive shaft 20 as a result of the rotation of blades 16. In this fashion it is not necessary to use a yaw control device to maintain the blades in the direction of the wind since there is no rotational force or resulting torque trying to rotate the upper transmission box 12 as the blades 16 rotate.

In reviewing the operation it should be remembered that in the upper transmission box 12 that it is gear 32 that is driving shaft 36 through the pawl 40 and that gear 34 drives sleeve 38 through the pawl 44. This feature is important in reviewing the operation of FIGS. 4, 5 and 6 which illustrate the action of the pawls 40 and 44 as the wind direction changes and blades 16 causes the upper transmission box 12 to rotate about the vertical coaxial shaft 20.

Figure 4B:
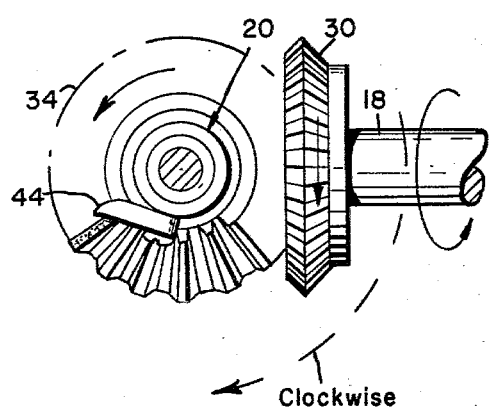
Figure 4A:
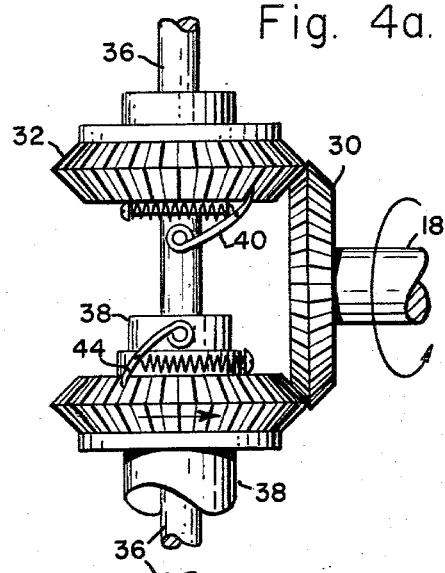

Referring now to FIG. 4a, there is shown a side view of upper transmission box 12 with the horizontal shaft 18 aligned with the wind in a given direction. The shaft 18 is always rotated in the same direction as illustrated thereby causing gear 30 to rotate which drives gears 32 and 34 in opposite directions.

FIG. 4b illustrates how pawl 44 is driven by the teeth of gear 34 so as to rotate sleeve 38.

Figure 5B:
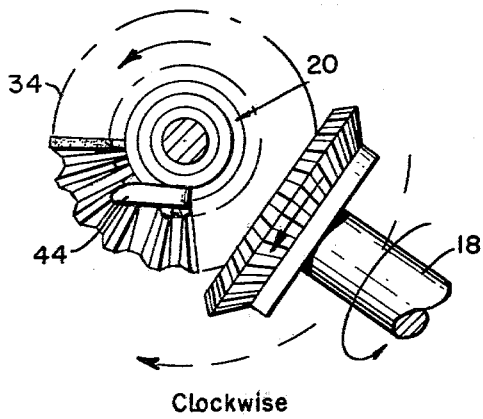
Figure 5A:
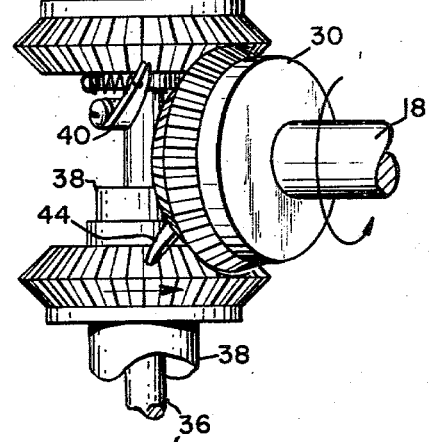

Referring now to FIG. 5(a), there is shown shaft 18 rotated in a different direction about the vertical coaxial shaft 20 as a result of a wind change impinging upon blades 16.

A review of FIG. 5b will show that as shaft 18 is rotated clockwise about the vertical coaxial shaft 20 that gear 30 being meshed with gear 34 will cause gear 34 to rotate. It must be remembered that gear 34 is arranged to freely rotate on sleeve 38 and that the only driving relationship between gear 34 and sleeve 38 is the pawl 44. As horizontal shaft 18 rotates in a clockwise direction as illustrated, gear 30 meshed with gear 34 will cause gear 34 to rotate about sleeve 38 also in a clockwise direction thereby disengaging pawl 44 from the teeth of gear 34. The number of teeth slipped over by pawl 44 will be a direct function of the degree of rotation of horizontal shaft 18 about the vertical coaxial shaft 20.

During the rotation of the horizontal shaft 18, gear 30 is still driving upper gear 32 which causes vertical shaft 36 to rotate by the action of pawl 40 engaged in the teeth of gear 32. In other words, rotation of the horizontal shaft 18 about the vertical shaft 36 in one direction allows pawl 44 to slip over the teeth of gear 34 while continuing to drive shaft 36 through pawl 40.

In a similar manner, rotating shaft 18 in the opposite direction than that illustrated will cause gear 30 to rotate with gear 32 opposite the direction of pawl 40 thereby allowing pawl 40 to skip over the teeth of gear 32 while at the same time gear 30 is driving gear 34 and through pawl 44 driving the sleeve 38.

In other words, regardless of which direction horizontal shaft is caused to rotate by changes in the wind direction, there will be rotation of either shaft 36 or sleeve 38 which ultimately transmits the counter rotating force through gears 52 and 54 in the lower transmission box 14 through gear 56 to the shaft 22 which drives the electrical generator and always in the same direction.

Figure 6B:
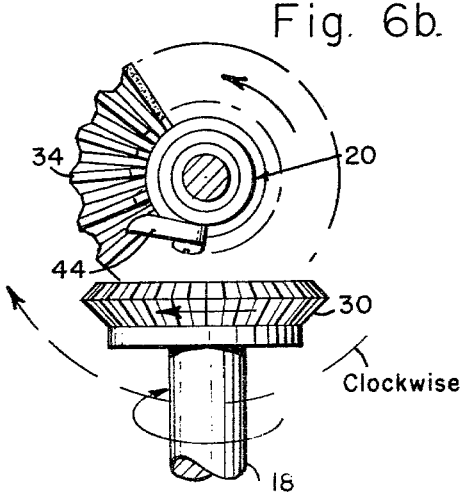
Figure 6A:
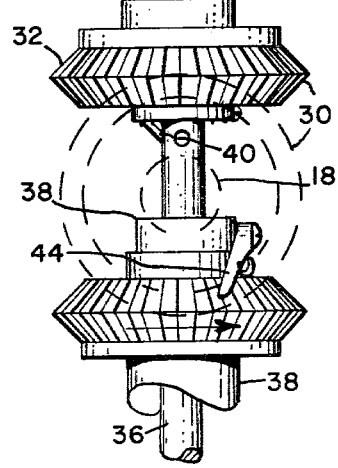

Referring now to FIG. 6a, there is shown a further rotation of horizontal shaft 18 in a clockwise direction to thereby illustrate the further slippage of pawl 44 over the teeth of gear 34.

In reviewing the action caused by the changing wind directions it will become apparent that power is transmitted through the coaxial shaft 20 either by pawl 40 or pawl 44 during the periods of wind change. During periods where the wind is constant and not changing direction, both pawls 40 and 44 will be driving shaft 36 and sleeve 38 in a counter rotating direction as illustrated. In this fashion the horizontal shaft 18 is free to rotate in any direction to follow the wind direction and without causing any change in the driving force transmitted to the output shaft 22 which is connected to the electric generator.

In describing the invention, the interconnection between the gears 32 and 34 in the upper transmission box 12 have been shown to drive shafts 36 and sleeve 38 by means of pawls 40 and 44, respectively. It is quite apparent that a ratchet device would be just as suitable and where large power transfer is to be achieved may be more suitable because of the increased load carrying capacity of the individual ratchets over the single pawls.

Referring now to FIGS. 7 and 8, there is shown another embodiment of the basic invention illustrating the use of ratchets in place of the pawls just described and also illustrating an application for use in helicopters and other vertical take-off machines.

FIG. 7 is intended to show an application of the present invention as applied to a helicopter where the problems of auto rotation are solved by eliminating the need for a clutch as a result of an engine malfunction which would require an auto rotation maneuver on the part of the pilot.

Aircraft engine 60 drives gear 62 through shaft 64. Gear 66 and 68 are mounted on coaxial shafts 70 and sleeve 72, respectively so as to drive shaft 70 and sleeve 72 in equal and opposite directions. Gear 74 is mounted on sleeve 72 and adapted to rotate freely about sleeve 72 and in a similar fashion gear 76 is mounted on shaft 70 and adapted to rotate freely about shaft 70.

A ratchet assembly 78 attached to sleeve 72 is adapted to mesh with a corresponding ratchet 80 attached to gear 74 in such a direction that the rotation of sleeve 72 drives gear 74 in a given direction only through pin 82 attached to sleeve 72.

In a similar fashion a ratchet 84 attached to shaft 70 by pin 86 is adapted to engage with a ratchet 88 fixedly attached to gear 76 whereby rotation of shaft 70 will cause gear 76 to rotate in a direction opposite to the rotation of gear 74. A compression spring 90 bearing against a collar 92 mounted on shaft 70 tends to keep ratchet 84 and 88 engaged. In a similar fashion compression spring 94 bearing against the side of collar 92 tends to keep ratchet 78 and 80 engaged. Gear 96 meshes with gear 74 and 76 is connected to a shaft 98 to which the helicopter blades 100 are attached.

It will be appreciated therefore that the rotation of shaft 64 by the engine 60 will cause the helicopter propeller blades 88 to rotate in the direction as illustrated to thereby provide lift caused by the rotating helicopter blades 100.

In considering the action of the loss of power of engine 60 and the problems occasioned by such an incident, it will be appreciated that engine 60 will cease to function but will still be directly connected as illustrated in FIG. 7.

In such a situation blades 100 will continue to rotate in the same direction as before, which rotation is now caused by the windmilling effect of the falling helicopter. In this condition gear 96 will rotate in the direction indicated and gears 76 and 74 will also be rotated in the same direction as indicated except that in this condition ratchet 74 attached to gear 76 will not drive ratchet 84 but will simply cause ratchet 84 to be cammed out of the way and not drive shaft 70.

In a similar fashion gear 74 will be rotated in the direction indicated and ratchet 80 will simply cam ratchet 78 away from the meshing teeth and not drive sleeve 72. Ratchets 84 and 78 are spring loaded and allowed to move in an axial direction and will maintain a meshing relationship caused by the action of springs 90 and 94 respectively.

In this configuration with the engine 60 inoperative, the rotating blades 100 will continue to rotate in an auto rotation mode rotating gear 96, gears 76 and 74, but otherwise not driving any of the gear train, which traction does not require a clutch nor the action of a pilot to engage or disengage any operative member. The action is completely automatic and is independent of the pilot and will work immediately upon the cessation of power from the driving source as indicated.

Another unobvious advantage of the mechanism illustrated in FIG. 7 is the fact that the system may also be used in those aircraft where it is desirous to take off vertically and then transcend from a vertical mode to a horizontal mode for increased speed and range. The rotation of shaft 98 about the shaft 70 and sleeve 72 so as to relocate the position of the blades 90 in either a horizontal or vertical mode is easily accomplished by external forces under the operation of the pilot and without the necessity of changing the pitch of the helicopter blades 90. In addition, the change of direction from a vertical to a horizontal position will cause the same slippage of either ratchets 82 and 84 or ratches 78 and 80 depending on which direction the shaft 88 is rotated. The analysis is the same as that given in connection with FIGS. 4, 5 and 6, the only difference being that previously the shaft was changed as a result of the changed wind direction whereas in connection with FIG. 7 the shaft position is changing under the direction of the pilot to accomplished a desired maneuver.

A review of the invention will show that the ratchets and the pawls are interchangeable and that any device allowing the driving force in one direction and a slipping force in the opposite direction within the framework of the teaching of the present invention may be used. In addition, the ratcheting mechanism illustrated in the upper transmission box may be located in a lower transmission box depending only upon the needs of the system and the ease of servicing the mechanical components.

The best mode of the invention is believed to be in the windmill application described in connection with FIGS. 1 through 6. The invention, however, has wide applicability in any system where an angular change of the driving force is required or desired and where the given rotation of the driving force remains the same. These applications include the helicopter application described in connection with FIG. 7 and may also include boat driving mechanisms where the horizontal propeller shaft is desired to be tiltable in a vertical as well as in a horizontal access as for trimming the boat while at the same time steering.

I claim:

1. A balanced power transfer device comprising:
   a first shaft having a first pinion gear fixedly attached to one end of said shaft,
   a first pair of gears each in a driving relationship with said first pinion gear and aligned on a second shaft that is orthogonal with respect to said first shaft,
   a cylindrical elongated sleeve coaxial with a portion of said second shaft and freely rotatable about said second shaft,
   said pair of gears including a first gear mounted on and freely rotatable about said second shaft, and a second gear mounted on and freely rotatable about said sleeve,
   a first ratchet assembly interconnecting said second shaft with said first gear in a driving relationship for shaft rotation in a given direction,
   a second ratchet assembly interconnecting said sleeve with said second gear in a driving relationship for shaft rotation in an opposite direction,
   a second pair of gears each fixedly attached to said second shaft and said sleeve respectively, and
   a second pinion gear fixedly attached on a third shaft that is orthogonal with respect to said second shaft and in a driving relationship with each of said second pair of gears whereby the counter rotation of the sleeve and the second shaft substantially removes any residual torque.

2. A balanced power transfer device according to claim 1 in which said first and second ratchet assembly is spring loaded to maintain the preferred driving relationship and is free to disengage if rotated in the opposite direction.

3. A balanced power transfer device according to claim 1 in which said first and second ratchet assembly includes at least a single spring loaded tooth or pawl.

4. A system for harnassing wind power comprising:
   a tower for supporting a first transmission box having a horizontal shaft adapted to support propeller blades,
   said first transmission box comprises a pinion gear fixedly attached to the opposite end of said horizontal shaft,
   a first pair of gears each in a driving relationship with said pinion gear and aligned on said centrally located shaft that is orthogonal with respect to said first shaft,
   said pair of gears including a first gear mounted on and freely rotatable about said centrally located shaft and a second gear mounted on and freely rotatable about said counter rotating sleeve,
   a first ratchet assembly interconnecting said centrally located shaft with said first gear in a driving relationship for shaft rotation in a given direction,
   a second ratchet assembly interconnecting said counter rotating sleeve with said second gear in a driving relationship for shaft rotation in said opposite direction
   said first transmission box freely rotatable 360 degrees in azimuth about said tower to allow changes in wind direction,
   a second transmission box located at the base of said tower and having a horizontal shaft adapted to drive electrical generating apparatus, and
   a coaxial shaft having a centrally located rotating shaft within a counter rotating sleeve interconnecting said first transmission box and said second transmission box for removing any residual torque about the coaxial shaft.

* * * * *